(No Model.)
J. R. WHITTEMORE.
RIDING HARROW AND CULTIVATOR.
No. 323,614. Patented Aug. 4, 1885.
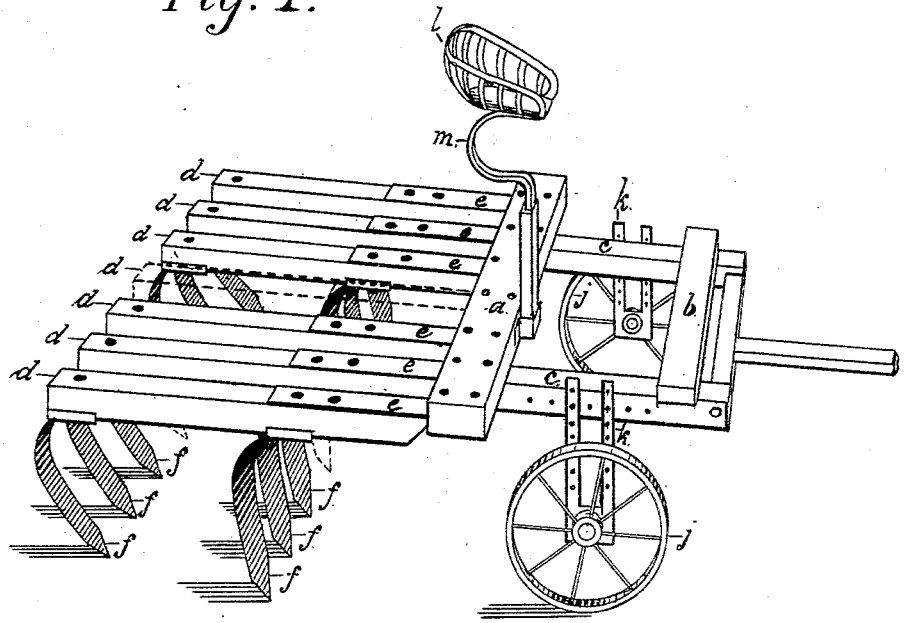
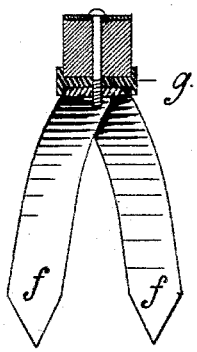
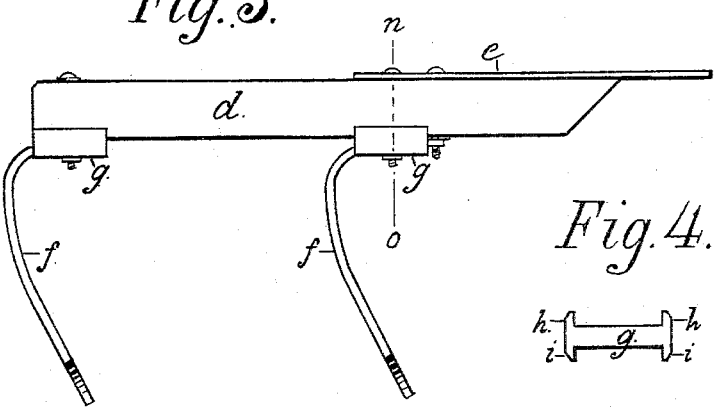
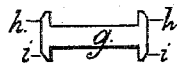
WITNESSES:
G. A. Griffin
Geo. H. Wills
INVENTOR
John R. Whittemore
BY Allen Webster
ATTORNEY

UNITED STATES PATENT OFFICE.

JOHN R. WHITTEMORE, OF CHICOPEE, MASSACHUSETTS.

RIDING HARROW AND CULTIVATOR.

SPECIFICATION forming part of Letters Patent No. 323,614, dated August 4, 1885.

Application filed December 17, 1884. (No model.)

*To all whom it may concern:*

Be it known that I, JOHN R. WHITTEMORE, a citizen of the United States, residing at Chicopee, Hampden county, Massachusetts, have invented new and useful Improvements in Riding Harrows and Cultivators, of which the following is a specification, reference being had to the accompanying drawings, in which— similar letters of reference indicating like parts—

Figure 1 is a perspective of my improved harrow. Fig. 2 is a side view of the tooth-beam having the teeth in position. Fig. 3 is an end view of the same, and Fig. 4 is an end view of the tooth-socket casting.

My invention relates to the harrows in which the weight of the driver is borne in part by wheels. It also relates to the construction of the frame and teeth.

The object of my invention is to construct an effectively-operating adjustable harrow, which, while being of simple and cheap construction, will combine the best features found in the most expensive harrows, and do away with the objectionable features found in the harrows heretofore made; and to that end my invention consists in the peculiar construction of the frame and teeth, and the arrangement and combination of the same, as herein pointed out, whereby the beneficial results are attained.

The main portion of the frame consists of the main beam *a*, draw-beam *b*, and cross-beams *c c'*. The tooth-beams *d* are secured to the main beam by flat springs *e*, which are bolted to the top of the tooth-beams and to the bottom of the main beam, a short space being left between the main and tooth beams for the action of the spring. The teeth *f* are secured to the tooth-beam upon its lower side by a bolt passing through the shank of the tooth and the tooth-beam. To enable me to hold the tooth firmly in position with one bolt, I provide an iron casting, *g*, which is provided with flanges or ribs *h* and *i*. The tooth-beam rests between the flanges *h*, and the tooth-shank rests between the flanges *i*. One bolt passing through the whole will hold them firmly together, and the flanges will prevent all side motion or twisting of the teeth on the tooth-beam. The teeth are made of steel, and the tooth portion is bent away from the shank without any turning or twisting of the portion of the tooth which comes in contact with the soil—that is, the plane of the face of the tooth is maintained in the direction of the draw. This I consider preferable to the old method of having the face of the teeth presented at an angle, as heretofore done, for the reason that with the old construction the soil is merely lifted and falls back in the furrow after the tooth passes, while with my construction the soil is moved from its original position, and is more thoroughly stirred and pulverized. The forward portion of the frame is supported upon two wheels, *j*, which are adjustably secured to the frame by means of the supports *k*. These supports and the frame-beams *c* are provided with a series of holes adapted to receive bolts passing through them. Thus the height of the frame from the ground may be varied by varying the position of the bolts in the supports, and the pressure upon the teeth may be varied by moving the supports or wheels either forward or back upon the harrow-frame. A seat, *l*, is supported upon a spring, *m*, which in turn is secured to the main beam *a*. The wheels should be of a height and the teeth of a length to permit the frame to pass over the crops when the device is used as a cultivator. The adjustable functions of the supporting-standards admit of their being set in any position to the frame, and so that when the weight of the operator is thrown forward of the axle of the carriage the frame will be tilted, and thus lift the tooth-beams and teeth free from the ground, and the implement may be thus drawn from place to place without the teeth dragging.

I prefer to construct the device with seven tooth-beams, and I provide each tooth-beam with two teeth, one being sprung to the right and one to the left of the center of the tooth-beam. The central tooth-beam may be removed, as shown in Fig. 1, and the device then used to cultivate at both sides of a row of corn at the same time, or two rows at once, the cultivator being so drawn that the central portion from which the tooth-beam has been removed will pass over the corn. The pole or shafts are secured to the frame by a hinge-connection, as shown, to permit of the free movement of the operative portions of the harrow on uneven ground. The attachment of the tooth-beams to the main beam in the manner shown maintains the teeth in the soil at the desired depth under all ordinary circumstances. If, however, any considerable obstruction is met with, the particular teeth which are affected by it are instantly relieved from the strain which might result in the breaking or stopping of the harrow by the upward motion allowed by the action of the flat-spring connection, which, upon the obstruction being passed, immediately forces the tooth-beam back to its normal position, while the operation of the other teeth are not interfered with. The teeth are curved forward, as shown, to draw the points into the soil.

The device constructed as shown may also be used as a potato-digger with good effect, two rows of potatoes being dug at the same time.

It will readily be seen that many of the parts may be greatly modified without departing from my invention, and I do not confine myself to the exact construction shown.

Having therefore described my invention, what I claim, and desire to secure by Letters Patent, is—

1. In combination with the carriage of a wheel-harrow, provided with a rear cross-beam and the tooth-beams, a flat spring having one end secured across the under face of the rear cross-beam of the frame, and the other end of the spring extended and secured to the upper face of the tooth-beams by a bolt set at a distance from the end of the tooth-beams, with the end of the tooth-beam and the lower edge of the rear cross-beam adjacent to each other, substantially as described.

2. In combination with the carriage-frame of a wheel-harrow, the side frame-pieces of which are provided with a series of holes arranged in a direction of the length thereof, an axle-bearing provided with vertical standards having a series of holes, and a fastening pin or bolt, whereby the standards may be adjusted longitudinally and vertically on the frame, substantially as described.

3. The combination of a harrow-frame with wheels $j$, adjustable supports $k$, tooth-beams $d$, secured to the frame by flat springs $e$, and teeth $f$, all arranged and operating substantially as shown.

4. The combination of a harrow-frame with wheels $j$, adjustable supports $k$, seat $l$, tooth-beams $d$, secured to the frame by flat springs $e$, and provided with teeth $f$, all constructed and operating substantially as shown.

JOHN R. WHITTEMORE.

Witnesses:
ALLEN WEBSTER,
H. C. BLISS.